(12) United States Patent
Kawamura et al.

(10) Patent No.: US 6,859,226 B2
(45) Date of Patent: Feb. 22, 2005

(54) CAMERA WITH FIRST AND SECOND COMPRESSION UNITS AND WITH A DIGITAL CAPTURE UNIT PROVIDING AN OUTPUT TO THE FIRST OR SECOND COMPRESSION UNIT

(75) Inventors: Hideaki Kawamura, Kanagawa-ken (JP); Kan Takaiwa, Tokyo (JP); Hiroyuki Horii, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/027,100

(22) Filed: Feb. 20, 1998

(65) Prior Publication Data

US 2001/0038415 A1 Nov. 8, 2001

Related U.S. Application Data

(63) Continuation of application No. 08/333,868, filed on Nov. 3, 1994, now Pat. No. 5,764,286, which is a continuation of application No. 08/170,459, filed on Dec. 20, 1993, now abandoned, which is a continuation of application No. 07/911,253, filed on Jul. 7, 1992, now abandoned, which is a continuation of application No. 07/497,195, filed on Mar. 22, 1990, now abandoned.

(30) Foreign Application Priority Data

Mar. 30, 1989 (JP) ............................................. 1-079588
May 19, 1989 (JP) ............................................. 1-124559

(51) Int. Cl.[7] ............................ H04N 5/76; H04N 7/26
(52) U.S. Cl. ................................ 348/231.3; 348/231.7; 386/109; 358/906
(58) Field of Search ................................ 348/231, 232, 348/233, 231.99, 231.3, 231.7, 231.1; 286/33, 38, 109, 111, 117; 358/905; 360/32

(56) References Cited

U.S. PATENT DOCUMENTS

| | | | | |
|---|---|---|---|---|
| 4,598,411 A | * | 7/1986 | Berkovich et al. | 348/409.1 |
| 5,016,107 A | * | 5/1991 | Sasson et al. | 348/231.1 |
| 5,018,017 A | * | 5/1991 | Sasaki et al. | 348/232 |
| 5,032,927 A | * | 7/1991 | Watanabe et al. | 348/109 |
| 5,034,804 A | * | 7/1991 | Sasaki et al. | 348/232 |
| 5,063,453 A | * | 11/1991 | Yoshimura et al. | 360/32 |
| 5,068,744 A | * | 11/1991 | Ito | 386/33 |
| 5,371,602 A | * | 12/1994 | Tsubo et al. | 386/111 |
| 5,764,286 A | * | 6/1998 | Kawamura et al. | 348/232 |

* cited by examiner

Primary Examiner—Wendy R. Garber
Assistant Examiner—Luong T. Nguyen
(74) Attorney, Agent, or Firm—Cowan Liebowitz & Latman

(57) ABSTRACT

A camera having an image capture unit and first and second image compression units adapted to compress a digital image outputted from the image capture unit in a first compression method and a second compression method which is different from the first compression method. First and second image decompressions units are adapted to decompress a digital image compressed in the first and second compression methods. The camera is adapted to provide a digital image outputted from the image capture unit to the first or the second image compression unit. The camera is further adapted to store a digital image compressed in the first or the second image compression unit in a removable memory unit, to provide a digital image read from the removable memory unit to the first image decompression unit if the digital image read from the removable memory unit is compressed in the first compression method, and to provide a digital image read from the removable memory unit to the second image decompression unit if the digital image read from the removable memory unit is compressed in the second compression method.

16 Claims, 4 Drawing Sheets

CAMERA WITH FIRST AND SECOND COMPRESSION UNITS AND WITH A DIGITAL CAPTURE UNIT PROVIDING AN OUTPUT TO THE FIRST OR SECOND COMPRESSION UNIT

This application is a continuation of U.S. application Ser. No. 08/333,868, filed Nov. 3, 1994, now U.S. Pat. No. 5,764,286, which is a continuation of U.S. application Ser. No. 08/170,459, filed Dec. 20, 1993, now abandoned, which is a continuation of U.S. application Ser. No. 07/911,253, filed Jul. 7, 1992, now abandoned, which is a continuation of U.S. application Ser. No. 07/497,195, filed Mar. 22, 1990, now abandoned.

BACKGROUND OF THE INVENTION

1. Field of the Invention

This invention relates to still video cameras using a solid-state memory device as the image recording medium.

2. Description of the Related Art

Electronic still video cameras using a magnetic floppy disc as the image recording medium are known. In view of recent advances in the high storage and low cost unit production technique of semiconductor memories, a new type of still video camera which makes use of a semiconductor memory device as the image recording medium is regarded as promising.

The image sensor of the still video camera, for example, the CCD type image sensor, even in the present state of art, has some five hundred thousand picture elements. In the near future, it is likely to realize an increase of the number of picture elements to one million or more. To store data of the great number of picture elements in the memory without deterioration, as one picture element takes 8 bits, for one frame of five hundred thousand picture elements, four megabits have to be used. To provide as high a capacity of image storage of 25 frames as that of the magnetic floppy disc, the number must be 25 times increased to one hundred megabits. However far the high storage capacity technique of semiconductor memories may advance, there can be demerits in cost, size and consumption of electric power.

In addition, the prior known camera of the above-described new type is made to include a compressing means. This compressing means is of the fixed form. So, it has been impossible either to selectively use a plurality of compressing methods, or to alter the compressing method.

SUMMARY OF THE INVENTION

It is an object of the invention to provide an improved camera apparatus and method.

This object is realized in a camera comprising: an image capture unit adapted to generate a digital image; a first image compression unit adapted to compress a digital image outputted from the image capture unit in a first compression method; a second image compression unit adapted to compress a digital image outputted from the image capture unit in a second compression method which is different from the first compression method; a first image decompression unit adapted to decompress a digital image compressed in the first compression method; and a second image decompression unit adapted to decompress a digital image compressed in the second compression method, wherein the camera adapted to provide a digital image outputted from the image capture unit to the first or the second image compression unit; wherein the camera adapted to store a digital image compressed in the first or the second image compression unit in a removable memory unit, wherein the camera adapted to provide a digital image read from the removable memory unit to the first image decompression unit if the digital image read from the removable memory unit is compressed in the first compression method, and wherein the camera adapted to provide a digital image read from the removable memory unit to the second image decompression unit if the digital image read from the removable memory unit is compressed in the second compression method.

The above object is further realized in a processing method for a camera, wherein the camera including an image capture unit adapted to generate a digital image, a first image compression unit adapted to compress a digital image outputted from the image capture unit in a first compression method, a second image compression unit adapted to compress a digital image outputted from the image capture unit in a second compression method which is different from the first compression method, a first image decompression unit adapted to decompress a digital image compressed in the first compression method, and a second image decompression unit adapted to decompress a digital image compressed in the second compression method, the method comprising the steps of: providing a digital image outputted from the image capture wilt to the first or the second image compression unit storing a digital image compressed in the first or the second image compression unit in a removable memory unit; providing a digital image read from the removable memory unit to the first image decompression unit if the digital image read from the removable memory unit is compressed in the first compression method; and providing a digital image read from the removable memory unit to the second image decompression unit if the digital image read from the removable memory unit is compressed in the second compression method.

Other objects and features of the invention will become apparent from the following written specification and drawings.

DETAILED DESCRIPTION OF THE PREFERRED EMBODIMENTS

The present invention is next described in connection with embodiments thereof by reference to the drawings.

Figure 1:
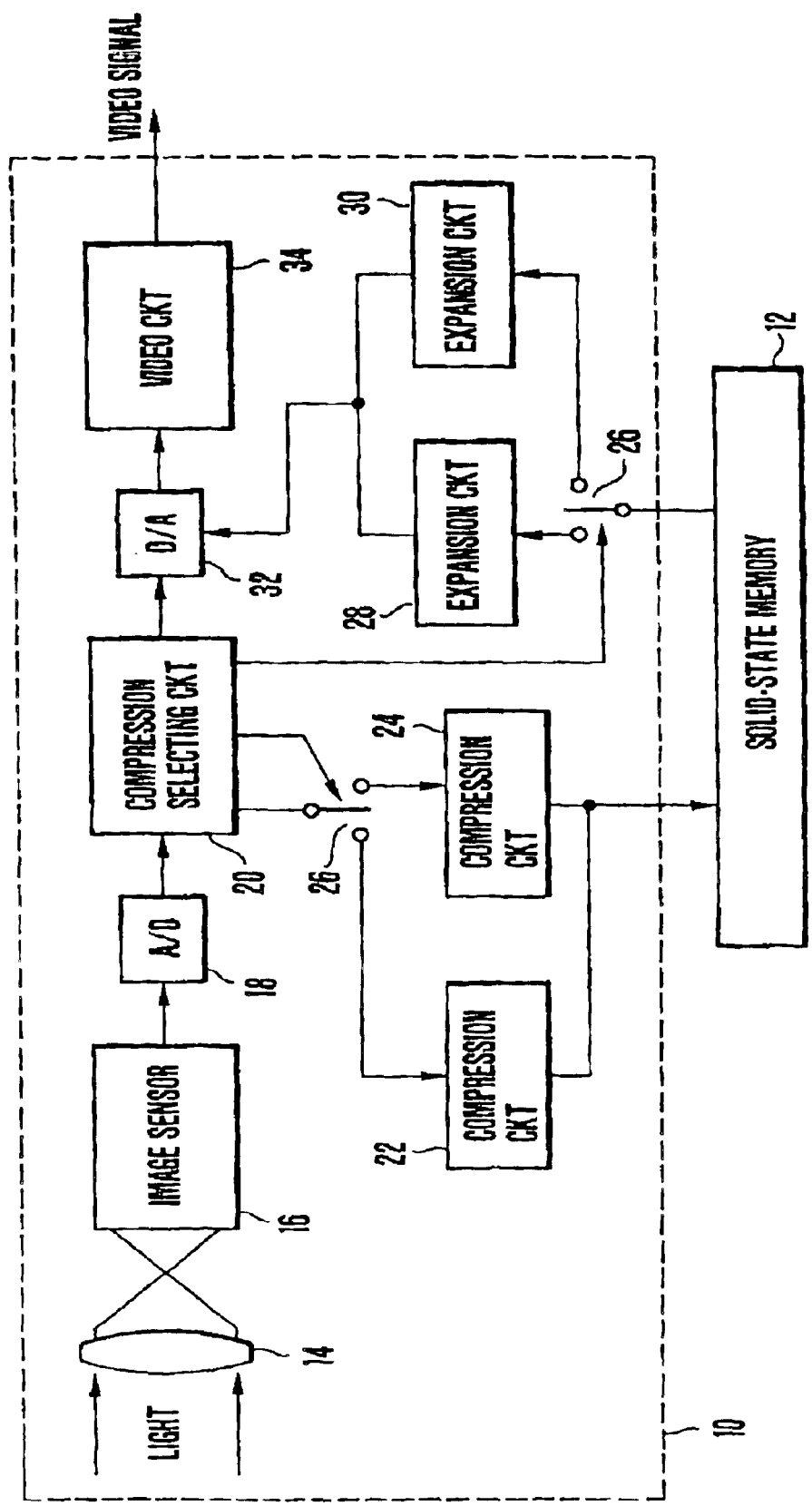
FIG. 1 is a block diagram of the construction of an embodiment of the invention.

FIG. 1 in schematic diagram shows an embodiment of the invention in which two compression processes can be selected to operate. A camera body 10 has a solid-state memory device 12 detachably attached thereto in which photographed images are recorded (stored). Light from an object to be photographed enters, through a photographic lens 14, an image sensor 16 where it is photoelectrically converted. The output of the image sensor 16 is converted to digital form by an A/D converter 18. A compression selecting circuit 20 determines selection of one of compression processes performed by compression circuits 22 and 24 to be applied to the data output from the A/D converter 18. Depending on the selection result, the compression selecting circuit 20 changes a switch 26 over between two positions, so that the output data of the A/D converter 18 is supplied to the selected one of the compression circuits 22 and 24. The compressed data by the compression circuit 22 or 24 is transferred to the solid-state memory device 12 where it is stored in a predetermined format.

If the camera body 10 has only a recording function, the solid-state memory device 12 is then detached from the camera body 10 and attached to a reproduction apparatus (not shown) where the recorded images are reproduced. In FIG. 1, however, the reproducing function too is illustrated. When the images are reproduced from the solid-state memory device 12, data stored in the solid-state memory device 12 is read out and supplied to one of two expansion circuits 28 and 30 selected by a switch 26. The expansion circuit 28 or 30 performs the expansion process corresponding to the compression process used in the recording. In more detail, the expansion circuit 28 expands the data compressed by the compression circuit 22, while the expansion circuit 30 expands the data compressed by the compression circuit 24.

The image data restored by the expansion circuit 28 or 30 is converted to analog form by a D/A converter 32, and then to a video signal by a video circuit 34.

It is to be noted that FIG. 1 is depicted with regard to the flow of image signals. Therefore, various kinds of switches for operation commands, a display device and further a control circuit for controlling the entirety, an electric power source circuit, etc., are omitted.

Next, the compression process in the compression circuit 22 or 24 is explained in detail. The natural image has a very strong correlation between any adjacent two of the picture elements. So, taking the differences between the adjacent picture elements gives, in most cases, small values. In other words, compared with the use of the absolute values (of, for example, 8 bits) in storing (recording) the image, the use of their differences in the storage can largely compress the data amount. This compressing method is called the "DPCM". Besides this, there are another compressing methods as improved over the DPCM, one of which is to adaptively vary the non-linearity of the non-linear quantization circuit according to the image, namely, the ADPCM. Yet another method is by transforming the image into a frequency domain, with a larger weight on the coefficient of the low-frequency component and a smaller weight on the coefficient of the high-frequency component, (namely, for example, the discrete cosine transformation).

Figure 2:
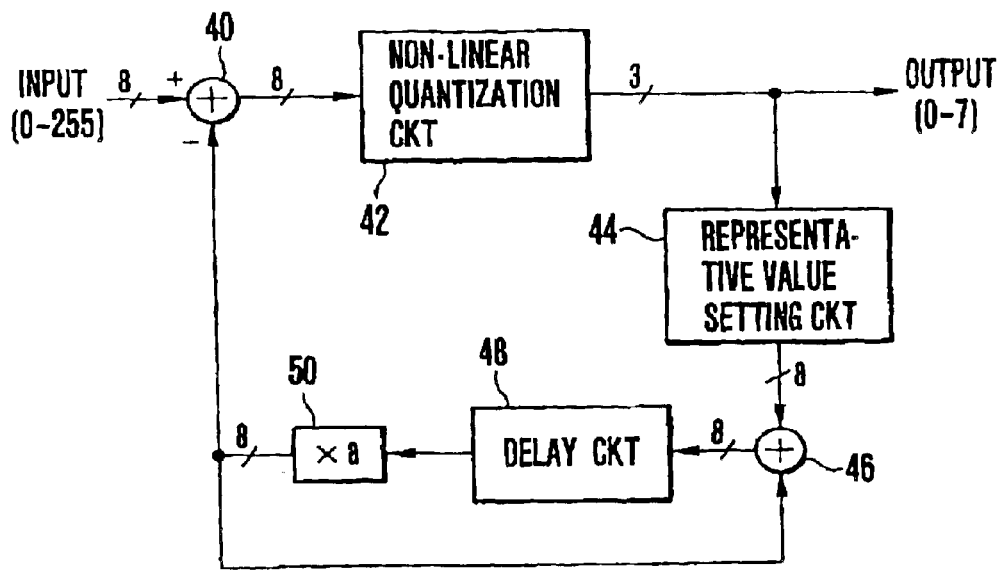
FIG. 2 is a block diagram illustrating the construction of the compression circuit.
Figure 3:
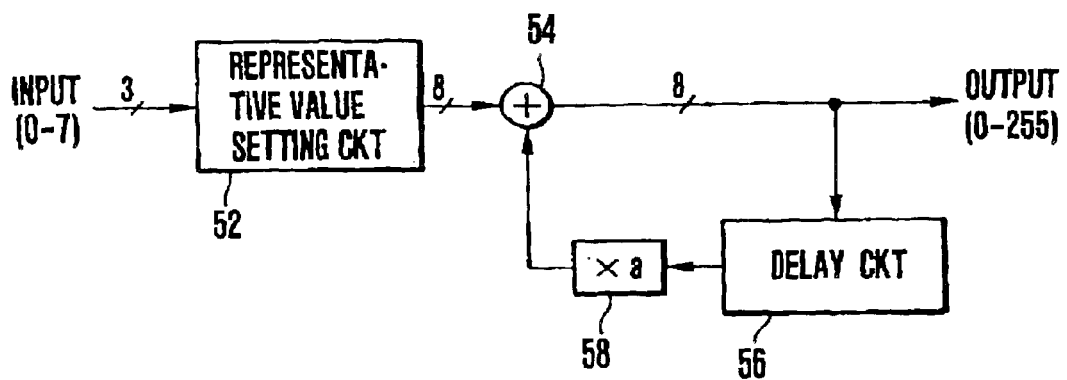
FIG. 3 is a block diagram illustrating the construction of the expansion circuit.

FIG. 2 in block diagram shows the construction of a compression circuit employing the DPCM, and FIG. 3 in block diagram shows the construction of an expansion circuit for expanding the compressed data. Incidentally, their details are described on pp. 146–159 of "Digital Signal Processing of Image" by Keihiko Suibatsu published by Nikkan Kogyo Shinbun Co. Ltd. The circuit of FIG. 2 comprises a subtractor 40, a non-linear quantization circuit 42, a representative value setting circuit 44, an adder 46, a delay circuit 48 and a coefficient multiplier 50. The subtractor 40 subtracts the output of the coefficient multiplier 50 from the input of 8-bit image data. The non-linear quantization circuit 42 non-linearly quantizes the output of the subtractor 40. Thereby the image data of the input is compressed from the 8 bits to, for example, 3 bits. The 3-bit output of the non-linear quantization circuit 42 is the compressed data which is aimed at.

The representative value setting circuit 44 reverts the 3-bit output of the non-linear quantization circuit 42 to a representative value of 8 bits. The adder 46 adds the output of the coefficient multiplier 50 to the output of the representative value setting circuit 44, i.e., the data (8 bits) of the representative value. The output of the adder 46 is delayed by one picture element by the delay circuit 48, concretely speaking, a data latch circuit, before it is supplied to the coefficient multiplier 50. The coefficient multiplier 50 multiplies the input by a constant coefficient, for example, 0.95, and supplies the multiplication result to the subtractor 40 and the adder 46 at the time of the inputting of the next data.

By repeating such a procedure, the 8-bit data is compressed to the 3-bit data.

The non-linear quantization circuit 42, the representative value setting circuit 44 and the coefficient multiplier 50 can be realized in the form of table transformation of ROM. So, high speed processing is possible.

Next, the expansion circuit of FIG. 3 comprises a representative value setting circuit 52, an adder 54, a delay circuit 56 for delaying the input by one picture element and a coefficient multiplier 58. The representative value setting circuit 52 is similar to the representative value setting circuit 44 of FIG. 2, transforming the input data (3 bits) to a representative value of 8 bits. The adder 54 adds the output of the coefficient multiplier 58 to the output of the representative value setting circuit 52. The output of the adder 54 becomes the restored data which is aimed at. The delay circuit 56 is a data latch circuit similar to the delay circuit 48, delaying the output of the adder 54 by one picture element before it is supplied to the coefficient multiplier 58. The coefficient multiplier 58 multiplies the input by a constant coefficient, for example, 0.95. Its output is supplied to the adder 54. By such a loop process, the compressed data (3 bits) of the input is expanded to the original data of 8 bits.

The discrete cosine transformation method as it details are described in pp. 179–195 of "Digital Signal Processing Image" by Keihiko Suibatsu published by Nikkan Kogyo Shinbun Co. Ltd., is briefly explained as follows. At first, by the discrete cosine transformation, the image data is orthogonally transformed and the frequency components are taken out. These frequency components are multiplied by such a coefficient that the low-frequency component is left, while the high-frequency component is removed. By this, the image information can be compressed. When the frequency components of the image are sided to the lower one, good compression with less deterioration can be carried out.

Next, the selection criterion by the compression selecting circuit 20 is explained. For simplicity, the compression circuits 22 and 24 themselves, or similar circuits, perform compression processing by each of the plurality of compressing methods, and whichever gives a less amount of data may be selected. If it is desired to speed up the selecting operation, a portion of the image, for example, the central one, only is subjected to the plurality of compression treatments. Based on the comparison of the data amounts, selection of one of the compression treatments may be made. Also, one of the compression circuits, say 22, employs a compression method which gives always a constant amount of compressed data, while the other compression circuit 24 employs another compression method which varies the amount of compressed data as a function of the image. So, from only the amount of data output from the compression circuit 24, which compression circuit 22 or 24 is to be selected may be determined.

The compression circuits 22 and 24 may employ different compressing methods from each other. But the compressing methods may be the same, or quantitatively different in the compression characteristic. In the case of DPCM, for example, the quantizing characteristic of the non-linear quantization circuit 42 is changed.

Though, in the above-described embodiment, the two compressing processes are selectively used, the invention is not confined to this and so includes a mode of non-compression and another mode of compression. Also, the image data is not only for black and white but also likewise for colors. Further, the selection of the compressing methods may otherwise be made not automatically but manually.

As is easily understandable from the foregoing description, according to the invention, the amount of data of an image to be recorded can be compressed by the method suitable to the respective individual image, thereby giving an advantage of more efficiently utilizing the image recording medium.

The invention is next described in connection with another embodiment thereof.

Figure 4:
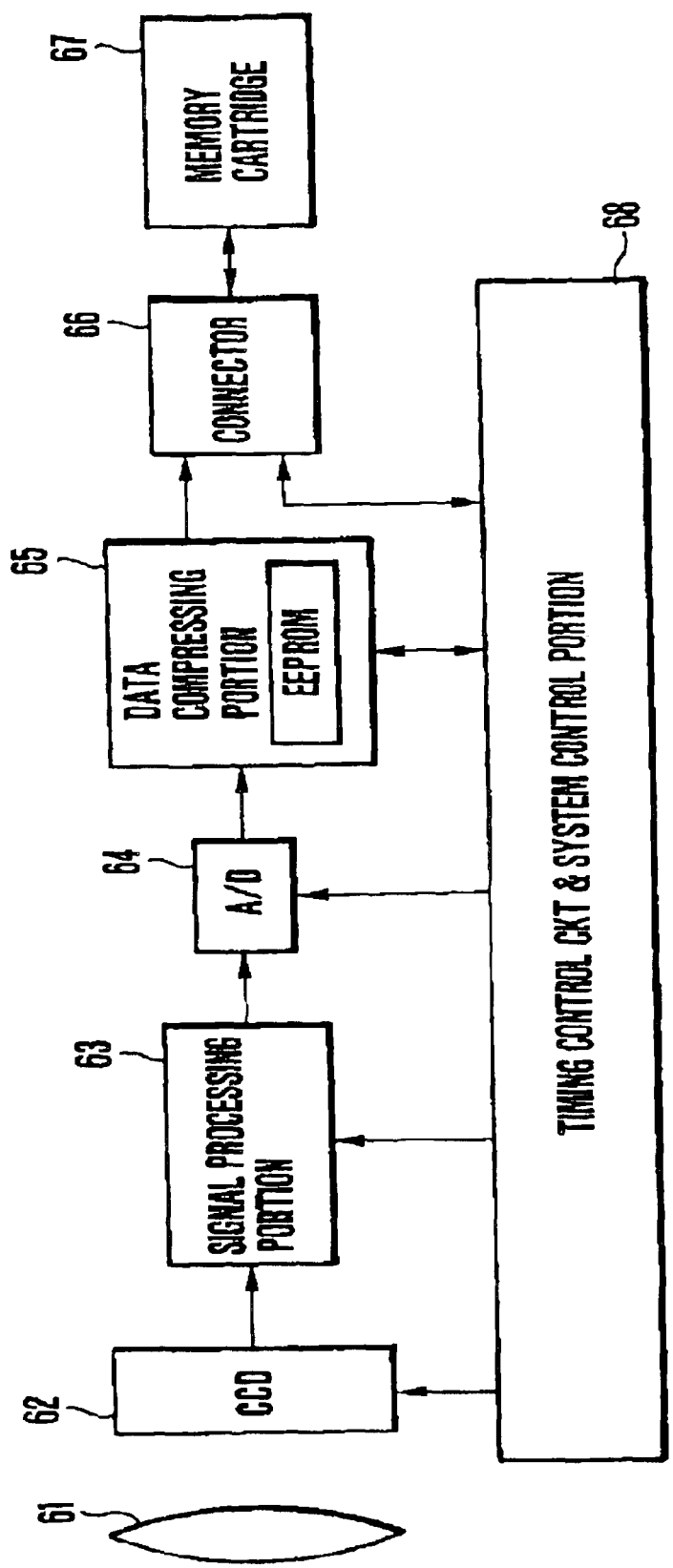
FIG. 4 is a block diagram of another embodiment of the invention.
Figure 5:
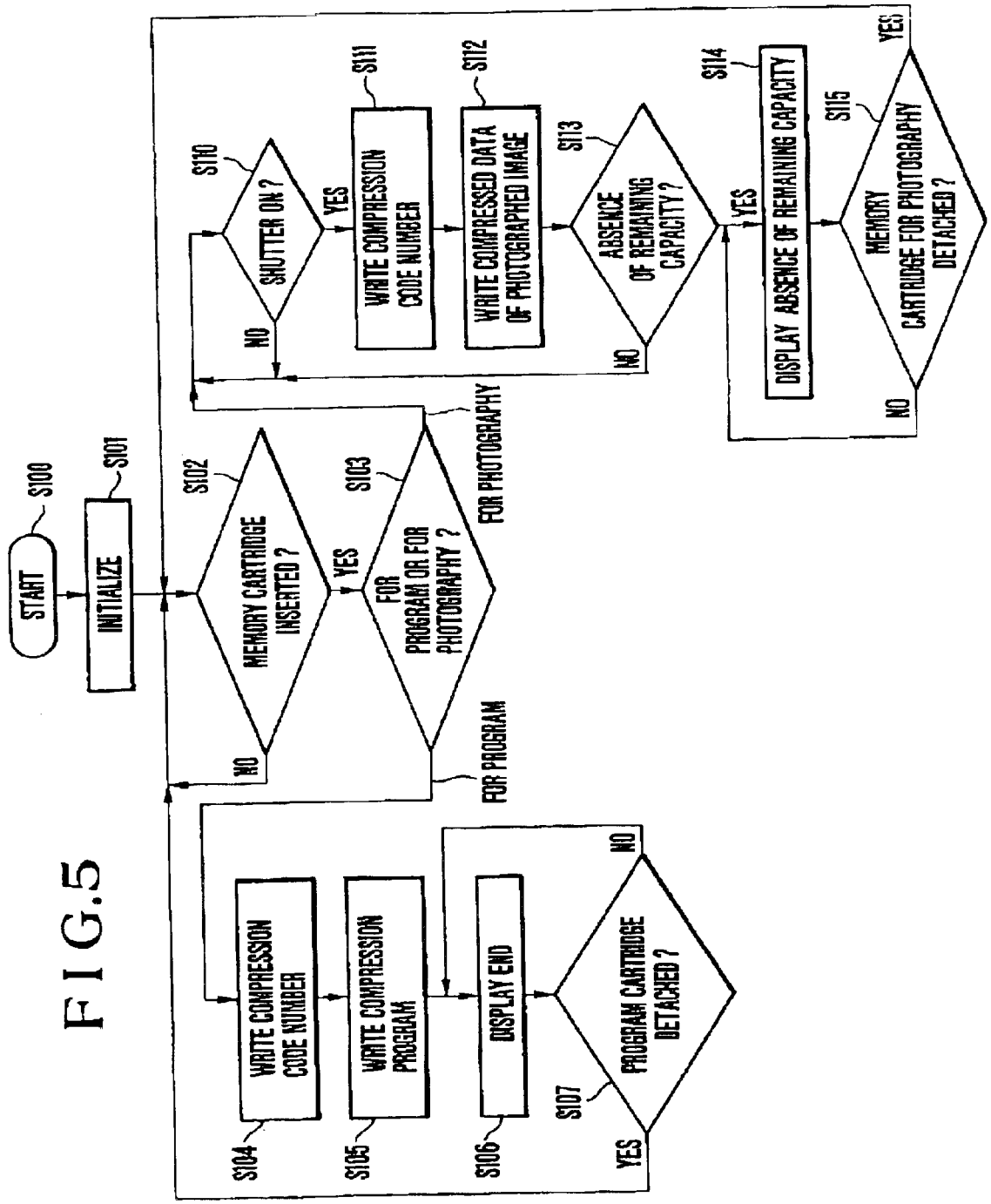
FIG. 5 is a flowchart for the operation of the embodiment of FIG. 4.

FIG. 4 in block diagram shows another embodiment of the still video camera according to the invention, and FIG. 5 is a flowchart for the operation of this embodiment.

In FIG. 4, the camera comprises a lens 61, a CCD 62 (solid-state image sensor) for converting an image formed thereon by the lens 61 to an electrical signal, a signal processing portion 63 for processing the signal output from the CCD 62, an A/D converter 64 for converting the signal output from the signal processing portion 63 to digital form, a data compressing portion 65 for compressing the digitized image signal, a connector 66, a memory cartridge 67 (memory element) detachably attached to the camera body, and a block 68 for controlling the entirety including a timing control circuit and a system control portion (hereinafter called the "system controller").

In the interior of the data compressing portion 65, a program ROM for determining the compressing method is incorporated. As this ROM, use is made of a rewritable EEPROM (Electrically Erasable Programmable Read-Only Memory). The memory cartridge 67 is available in types for photography and for a compression program. When the latter type is in use, the content of the EEPROM in the data compressing portion 65 is rewritten by the system controller 68 into the content of the compression program cartridge.

FIG. 5 shows a flowchart for the operation of this embodiment.

After initialization (step S101) has been done, when a memory cartridge is inserted (step S102), whether it is for photography or for compression programs is discriminated (step S103). If for compression programs, a compression code number representing the compression program is written (step S104) and the compression program is transferred to the EEPROM (step S105). When this has ended, the "end" display is presented (step S106). If it is for photography, an initiation of a shutter operation (step S110) is followed by writing the compression code number (step S111) and the photographed image data (step S112).

In such a manner, the program for use in the compression of the video signal can be written and rewritten in the form of electrical signals by the cartridges from the outside of the camera.

It should be noted that the camera may be provided with an input terminal for program, from which a program for compression is supplied in the form of an electrical signal by an adequate device, thus rewriting the program of the EEPROM of the data compressing portion 65.

As has been described above, according to the present embodiment, the program for compression of the data in the camera is alterable by the electrical signal supplied from the outside of the camera. Therefore, a wide variety of compressing methods become selectively usable. Hence, the camera is made convertible to the newest data compression type. Further, when the object to be photographed is a flower, the camera can be made to operate with the selection of one of the compressing methods which is most suited to the flower.

What is claimed is:

1. A camera comprising:

an image capture unit adapted to generate a digital image;

a first image compression unit adapted to compress a digital image outputted from the image capture unit in a first compression method;

a second image compression unit adapted to compress a digital image outputted from the image capture unit in a second compression method which is different from the first compression method;

a first image decompression unit adapted to decompress a digital image compressed in the first compression method; and a second image decompression unit adapted to decompress a digital image compressed in the second compression method, wherein the camera adapted to provide a digital image outputted from the image capture unit to the first or the second image compression unit;

wherein the camera adapted to store a digital image compressed in the first or the second image compression unit in a removable memory unit, wherein the camera adapted to provide a digital image read from the removable memory unit to the first image decompression unit if the digital image read from the removable memory unit is compressed in the first compression method, and wherein the camera adapted to provide a digital image read from the removable memory unit to the second image decompression unit if the digital image read from the removable memory unit is compressed in the second compression method.

2. A camera according to claim 1, further comprising an output unit adapted to convert a digital image decompressed by the first or the second image decompression unit to an analog image, and output the analog image to outside of the camera.

3. A camera according to claim 2, wherein the first compression method uses a discrete cosine transform.

4. A camera according to claim 2, wherein the camera is adapted to automatically select the first or second compression method.

5. A camera according to claim 2, wherein the camera is adapted to manually select the first or second compression method.

6. A camera according to claim 1, wherein the first compression method uses a discrete cosine transform.

7. A camera according to claim 1, wherein the camera is adapted to automatically select the first or second compression method.

8. A camera according to claim 1, wherein the camera is adapted to manually select the first or second compression method.

9. A processing method for a camera, wherein the camera including an image capture unit adapted to generate a digital image, a first image compression unit adapted to compress a digital image outputted from the image capture unit in a first compression method, a second image compression unit adapted to compress a digital image outputted from the image capture unit in a second compression method which is different from the first compression method, a first image decompression unit adapted to decompress a digital image compressed in the first compression method, and a second image decompression unit adapted to decompress a digital image compressed in the second compression method, the method comprising the steps of:

provial a digital image outputted from the image capture unit to the first or the second image compression unit;

storing a digital image compressed in the first or the second image compression unit in a removable memory unit;

providing a digital image read from the removable memory unit to the first image decompression unit if the digital image read from the removable memory unit is compressed in the first compression method; and providing a digital image read from the removable memory unit to the second image decompression unit if the digital image read from the removable memory unit is compressed in the second compression method.

10. A processing method according to claim 9, further comprising a step of converting a digital image decompressed by the first or the second image decompression unit to an analog image, and outputting the analog image to outside of the camera.

11. A processing method according to claim 10, wherein the first compression method uses a discrete cosine transform.

12. A processing method according to claim 10, further comprising a step of automatically selecting the first or second compression method.

13. A processing method according to claim 10, further comprising a step of manually selecting the first or second compression method.

14. A processing method according to claim 9, wherein the first compression method uses a discrete cosine transform.

15. A processing method according to claim 9, further comprising a step of automatically selecting the first or the second compression method.

16. A processing method according to claim 9, further comprising a step of manually selecting the first or second compression method.

* * * * *